United States Patent Office 3,115,471
Patented Dec. 24, 1963

3,115,471
REMOVER FOR FLUORESCENT AND TEMPORARY CAMOUFLAGE PAINT SYSTEMS
Stephen A. Matuska, Philadelphia, and Anthony J. Koury, Havertown, Pa., assignors to the United States of America as represented by the Secretary of the Navy
No Drawing. Filed Aug. 16, 1961, Ser. No. 131,939
4 Claims. (Cl. 252—170)
(Granted under Title 35, U.S. Code (1952), sec. 266)

The invention described herein may be manufactured and used by or for the Government of the United States of America for governmental purposes without the payment of any royalties thereon or therefor.

This invention relates to a new type of paint remover, and more particularly is directed to a composition which is capable of selectively removing fluorescent, camouflage and other such temporary paint systems from the exterior surfaces of aircraft without attacking the permanent undercoatings.

It is necessary to paint the exterior surfaces of aircraft and other such military equipment with a temporary coating so as to blend them with the surrounding terrain thereby making it difficult for observation.

When the equipment was readied for operation, the temporary coating had to be removed. Under the prior practice, this was accomplished by wiping the exterior surfaces with rags saturated with mineral spirits. Whereupon the temporary coating was removed without damage to the substrate thereunder. The disadvantages of this procedure were that it was slow and tedious requiring considerable time and effort to effectuate a satisfactory removal of the temporary coating. In addition the used rags, saturated with mineral spirits, oftentimes were thrown upon the ground thereby creating a fire hazard.

These aforementioned disadvantages in the old method and the necessity for removing such protective coatings resulted in our development of a new composition in that class of what is generally referred to as "paint removers." Prior art paint removers include the alkali type, which includes aqueous mixtures containing alkali or ammonia dissolved therein. They may be classed as aqueous in the sense that water forms the major proportion of the constituents employed and water or water solution forms the external or continuous phase. Such materials act primarily by chemical attack on the protective coating film.

For our purposes all of these paint removers proved to be ineffective because of the presence of strong detergents which not only removed the temporary coating but also the permanent substrate.

Consequently, it became an object of this invention to provide an improved composition for completely removing, in a relatively short period of time, either fluorescent or temporary camouflage paint systems from surfaces which have been coated therewith, without harmful effects upon the permanent undercoatings.

It is a further object of this invention to provide a composition for selectively removing temporary paint systems which is water-rinsable, which is non-flammable, and which is stable.

Other objects and many of the attendant advantages of this invention will be readily appreciated as the same becomes better understood by reference to the following detailed description.

We have developed a paint remover of the aqueous type, employing this term in the sense that it is an oil in water emulsion. The unique characteristic of this composition is that it does not contain any alkali, acid or phenolic deriatvives which would cause harm to the permanent undercoating, but on the other hand, does have sufficient solvents dispersed throughout the emulsion to dissolve the temporary paint. This oil in water emulsion has a high adhesive tension against the protective coating.

Because of these properties, the paint remover of our invention can be sprayed, brushed, or run into a surface coated by the protective coating to be removed. Both the oil in water emulsion characteristic and the concentrations of the individual ingredients making up the composition forming the paint remover of our invention are such that the mechanical motion inherent in the application of the paint remover to the coated surface gives a liquid of such low viscosity as to permit ready application. When applied to the surface to be treated, the composition adheres to the protective coating. This is equally so for both horizontal and vertical surfaces. The coating of the composition will not run appreciably on the vertical or horizontal surface but will remain in place where applied after the mechanical agitation incidental to its application is discontinued.

Our paint remover is a light yellow oil in water emulsion. We employ as our oil carrier an aromatic hydrocarbon, xylene. Other commonly known carriers, such as benzene and toluene, were unsuitable for use in this compound in that they are too toxic.

In order to achieve the result of selective removal of the top layer of camouflage or fluorescent paint from an aircraft surface without damaging the permanent coating underneath, we employ a combination of a penetrant, such as pine oil, with a group of weak solvents consisting of cyclohexanol, mono-n-butyl ether of ethylene glycol and isopropyl alcohol. The pine oil will penetrate through the temporary layer thereby exposing it to the action of the solvents. We control the concentration of the pine oil so that it will not attack the permanent substrate. The solvents also function as coupling agents which provide for adhesion of the composition to the temporary coating.

In order to assist in imparting emulsifying characteristics to our paint remover, we employ a specific compound designated in the trade as Triton X–102. This ingredient may be defined as a t-octyl phenol having 12 to 13 polyoxyethylene groups. The compound is one of a series of Triton X compounds manufactured by Rohm & Haas which differ from each other in the number of polyoxyethylene groupings contained in the formulation. The number of these groups ranges from 1 to 16. Of these, only Triton X–102 provides a stabilized emulsion; the others, although readily forming a creamy emulsion with gentle agitation, separate on standing.

The following examples illustrate the formulations embodying the principles of our invention: In order to obtain a balanced emulsion, the concentrations of the ingredients are critical.

*Example I*

| Ingredients: | Percent by weight |
|---|---|
| Xylene | 66.2 |
| Triton X–102 | 4.0 |
| Pine oil | 3.0 |
| Cyclohexanol | 3.0 |
| Mono-n-butyl ether of ethylene glycol | 2.0 |
| Isopropyl alcohol | 0.5 |
| Water | 21.3 |

Example II

| Ingredients: | Percent by weight |
|---|---|
| Xylene | 66.2 |
| Triton X-102 | 4.0 |
| Pine oil | 3.0 |
| Cyclohexanol | 3.0 |
| Mono-n-butyl ether of ethylene glycol | 2.0 |
| Isopropyl alcohol | 0.5 |
| Water | 21.1 |
| Sodium chromate | 0.2 |

It is to be noted that weathered fluorescent and temporary camouflage systems require spot testing with remover prior to actual full-scale removal. If the spot tests indicate that the remover, as packaged, may attack the substrate permanent paint systems, it becomes necessary to dilute the paint remover with mineral spirits to the strength desired while maintaining a satisfactory consistency. It was found that if corn starch were added to the original formulation and if the remaining constituents were reduced in definite and specific proportions, the formulation could be diluted to varying strengths with mineral spirits without sacrificing any of its characteristics.

The following example illustrates the formulation embodying the principle of our invention:

Example III

| Ingredients: | Percent by weight |
|---|---|
| Xylene | 56.3 |
| Triton X-102 | 3.4 |
| Pine oil | 2.6 |
| Cyclohexanol | 2.6 |
| Mono-n-butyl ether of ethylene glycol | 1.7 |
| Isopropyl alcohol | 0.4 |
| Water | 17.8 |
| Sodium chromate | 0.2 |
| Corn starch | 15.0 |

In the practice of our invention, we thoroughly cleaned the surfaces of a fuel tank, which contained a fluorescent paint coating over top of an acrylic nitrocellulose lacquer subcoat, with the use of a water base cleaning compound. The tanks were water rinsed before the water base cleaning compound was brush applied to the moistened surface. After a two to three minute dwell time, the surfaces were scrubbed with a horsehair brush whereby all oils and soils found on the fuel tanks were removed therefrom. A spot test is made on the tanks in order to determine if any dilution with mineral spirits is necessary. When the tanks were dry, we applied a medium-heavy coat of the subject paint remover (diluted with mineral spirits if necessary) uniformly over the surface by flowing or brushing it across the surface of the tank. The application is repeated in five to ten minutes, after which it is allowed to sit for five minutes. Any paint not loosened is freed by brushing with a bristle saturated with fresh remover. After washing and scrubbing, an air-water rinse gun is used to remove the loosened paint and spent remover. Using this procedure, it was possible to completely remove the temporary fluorescent layer of paint from the entire fuel tank within one hour, and in addition, there was no appreciable attack upon the permanent substrate.

While we have described a particular embodiment of our invention, it should be understood that various modifications and adaptations thereof may be made within the spirit of the invention as set forth in the appended claims.

We claim:

1. A paint stripping composition for selectively removing a temporary paint system from a permanent painted surface coated therewith without attacking the permanent substrate, said composition consisting of the following constituents:

| Constituent: | Percent by weight |
|---|---|
| Xylene | 66.2 |
| t-Octyl phenol having 12-13 polyoxyethylene groupings | 4.0 |
| Cyclohexanol | 3.0 |
| Mono-n-butyl ether of ethylene glycol | 2.0 |
| Pine oil | 3.0 |
| Isopropyl alcohol | 0.5 |
| Water | 21.3 |

2. A paint stripping composition for selectively removing a temporary paint system from a permanent painted surface coated therewith without attacking the permanent substrate, said composition consisting of the following constituents:

| Constituent: | Percent by weight |
|---|---|
| Xylene | 66.2 |
| t-Octyl phenol having 12-13 polyoxyethylene groupings | 4.0 |
| Pine oil | 3.0 |
| Cyclohexanol | 3.0 |
| Mono-n-butyl ether of ethylene glycol | 2.0 |
| Isopropyl alcohol | 0.5 |
| Water | 21.1 |
| Sodium chromate | 0.2 |

3. A paint stripping composition for selectively removing a temporary paint system from a permanent painted surface coated therewith without attacking the permanent substrate, said composition consisting of the following constituents:

| Constituent: | Percent by weight |
|---|---|
| Xylene | 56.3 |
| t-Octyl phenol having 12-13 polyoxyethylene groupings | 3.4 |
| Pine oil | 2.6 |
| Cyclohexanol | 2.6 |
| Mono-n-butyl ether of ethylene glycol | 1.7 |
| Isopropyl alcohol | 0.4 |
| Water | 17.8 |
| Sodium chromate | 0.2 |
| Corn starch | 15.0 |

4. In a method for selectively removing a coating of temporary paint from an article, having a permanent coating of paint, coated therewith without harming the permanent substrate, the steps comprising exposing the said article to a composition in accordance with claim 3 until the said temporary paint becomes loosened and rinsing the article with water thereby removing the said loosened paint and the spent remover.

References Cited in the file of this patent

UNITED STATES PATENTS 2,479,628    Kuentzel    Aug. 23, 1949

FOREIGN PATENTS 1,101,824    France    Apr. 27, 1955

OTHER REFERENCES

"Soap and Chemical Specialties," vol. 32, May 1956, pp. 175-178 and 221.

Chemical Formulary, Bennett, vol. 4, 1943, pp. 340-341.

Chemical Formulary, Bennett, vol. 8, 1948, pp. 281,